July 7, 1925.
L. A. BEAN
1,544,881
AUTOMOBILE HEADLIGHT SUPPORTING MEANS
Original Filed July 3, 1923
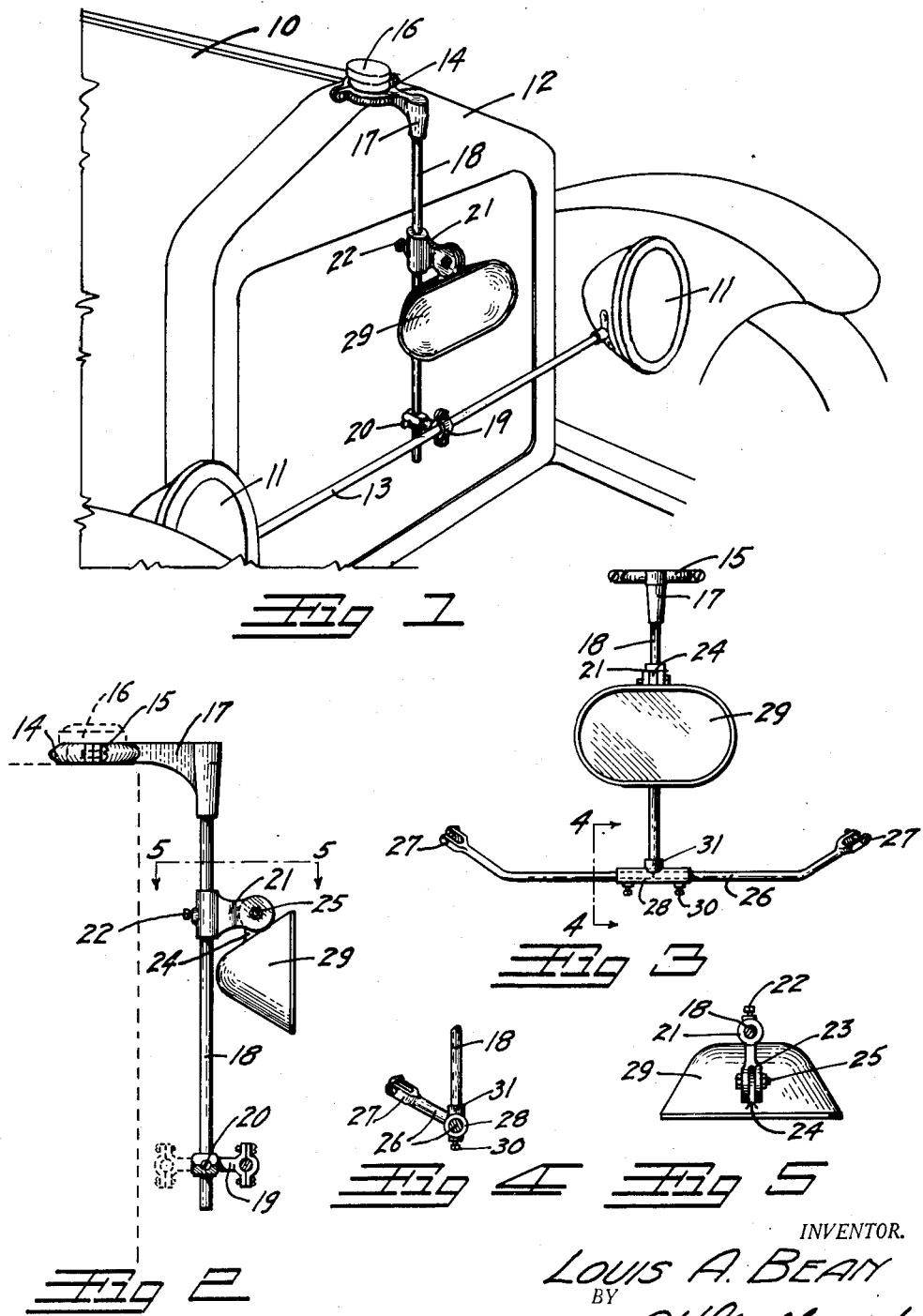
INVENTOR.
LOUIS A. BEAN
BY
ATTORNEY.

Patented July 7, 1925.

1,544,881

UNITED STATES PATENT OFFICE.

LOUIS A. BEAN, OF DENVER, COLORADO.

AUTOMOBILE HEADLIGHT SUPPORTING MEANS.

Application filed July 3, 1923, Serial No. 649,253. Renewed April 30, 1925.

*To all whom it may concern:*

Be it known that I, LOUIS A. BEAN, a citizen of the United States, residing at Denver, in the county of Denver and State of Colorado, have invented certain new and useful Improvements in Automobile Headlight Supporting Means, of which the following is a specification.

The invention relates more particularly to means for supporting an accessory or extra headlight or spotlight in combination with the present headlight equipment of an automobile and has for its principal object the provision of a support of this character which can be readily attached to the present types of automobiles without the necessity of drilling or tapping holes or interfering with the present equipment in any way.

A further object is to so construct the device that its adjustments will be practically universal so that it can be readily adjusted to fit to any of the present types of automobiles.

A still further object is to provide means whereby the height of and the vertical and horizontal angles of the light can be easily adjusted.

Another object is to relieve strains and stresses in the light supporting bracket by hanging the lamp from its support at a point practically over the center of gravity of the lamp.

Other objects and advantages reside in the detail construction of the invention, which result in simplicity, economy and efficiency, and which will become more apparent from the following description.

In the following detailed description of the invention reference is had to the accompanying drawing which forms a part hereof. Like numerals refer to like parts in all views of the drawing and throughout the description.

In the drawing:

Fig. 1 is a fragmentary perspective view of an automobile front, showing the invention in use.

Fig. 2 is a side elevation of the invention.

Fig. 3 is front view of the invention as applied to certain types of automobiles.

Fig. 4 is a vertical cross section taken on the line 4—4, Fig. 3.

Fig. 5 is a horizontal cross section taken on the line 5—5, Fig. 2.

Let the numeral 10 designate an automobile, 11 the headlights thereof and 12 the radiator. Practically all of the present models of automobiles are provided with a cross brace 13, secured between the headlights or the headlight supporting stems, as shown in Fig. 1, in all such models the present invention makes use of this cross brace 13, as will be later described.

The invention comprises a radiator clamp 14, which is formed of two parts clamped together by means of screws or bolts 15, adapted to fit around and clamp to the filling nipple 16 of the radiator 12. Formed integrally with one part of the radiator clamp 14, and extending forward therefrom, is an arm 17 in which is secured a vertical rod 18.

Rod 18 extends downward in front of the radiator 12 to or below the cross brace 13, to which it is secured by means of a cross rod clamp 19.

In the various models of automobiles the cross brace 13 will be found at various heights and varying distances from the radiator 12. To accommodate the varying height the cross rod clamp 19 is slidably mounted on the vertical rod 18 and when it has been placed at the proper height, is held in place by a set screw 20. To accommodate the varying distances of the rods 13 from the radiators 12, the arm 17 is made of sufficient length to allow the rod 18 to depend at the mean or average distance from the radiator 12 and the cross rod clamp of a length approximating the distance from the mean point to the extreme point. In those automobiles in which the rod 18 depends to the rear of the cross brace 13, the cross brace clamp 19 is turned forward as shown in Figs. 1 and 2. In those automobiles in which the rod 18 depends in front of the cross brace 13, the cross brace clamp 19 is turned rearward as shown in broken line in Fig. 2. This method of adjustment has been found to result in holding the rod 18 practically vertical in nearly every case.

Slidably mounted upon the vertical rod 18, is a lamp bracket 21 which may be locked at any desired height by means of a set screw 22. The forward projecting extremity of the lamp bracket 21 is bifurcated, as shown at 23, Fig. 5, to receive a tongue 24 formed on the housing 29 of the light which it is desired to carry. Tongue 24 is held in position in the bifurcation 23 by means of a clamp bolt 25.

Tongue 24 is formed on the light housing directly over the center of gravity thereof. This relieves the bracket from any stresses in holding the light vertical since it will hang in the vertical position even with the clamp bolt 25 loosened. Should it be desired, however, to place the light at any angle from the vertical it can be held in the desired position by the bolt 25.

For attaching to those automobiles which do not have the cross braces 13 as regular equipment, the invention is provided with a cross rod 26 having bifurcated extremities 27 adapted to clamp to the headlight supporting stems of the automobile. Cross rod 26 is preferably made in two sections to facilitate its attachment to the automobile. The two sections are joined at the meeting point in a sleeve 28 and are held in position in said sleeve by suitable set screws 30. Sleeve 28 carries a socket 31, in which the lower extremity of the vertical rod 18 is held.

It will be noted that since the lamp is carried by the radiator it is subject to a minimum of vibration as automobile radiators are carried on springs and have provision made to reduce vibration and protect their delicate construction from injury. The protected position of the lamp also reduces the possibility of its becoming injured in collisions.

The lamp housing 29, as illustrated, is shown and described in the applicant's Patent 1,480,364, for improvements in reflectors, and it was for this particular lamp that this invention was primarily designed. The invention however will be found valuable for the support of any accessary lamp on an automobile.

While a specific form of the improvement has been described and illustrated herein, it is desired understood that the same may be varied, within the scope of the appended claims, without departing from the spirit of the invention.

Having thus described the invention what is claimed and desired secured by Letters Patent is:—

Automobile lamp supporting means, comprising, in combination, a clamp adapted to engage the radiator filling nipple of said automobile and extending forward therefrom; a vertical rod depending from said forward extending portion; a second clamp secured to said rod and adapted to engage the headlight cross brace of said automobile, said second clamp being vertically and rotatably adjustable on said vertical rod, and a similarly adjustable lamp supporting bracket mounted on said vertical rod between said first and second clamps.

In testimony whereof, I affix my signature.

LOUIS A. BEAN.